(12) United States Patent
Morikawa et al.

(10) Patent No.: US 6,656,556 B2
(45) Date of Patent: Dec. 2, 2003

(54) OPTICALLY TRANSPARENT PRESSURE SENSITIVE ADHESIVE SHEET FOR USE IN HEAT TRANSFER IMAGE PATTERN FORMATION AND OPTICALLY TRANSPARENT DECORATIVE PRESSURE SENSITIVE ADHESIVE SHEET

(75) Inventors: Yasushi Morikawa, Chiba-ken (JP); Kazuhito Kojima, Tokyo (JP); Satoshi Sakurai, Chiba-ken (JP)

(73) Assignee: Lintec Corporation, Tokyo (JP)

( * ) Notice: Subject to any disclaimer, the term of this patent is extended or adjusted under 35 U.S.C. 154(b) by 64 days.

(21) Appl. No.: 09/897,132

(22) Filed: Jul. 3, 2001

(65) Prior Publication Data

US 2002/0006492 A1 Jan. 17, 2002

(30) Foreign Application Priority Data

Jul. 11, 2000 (JP) ........................................ 2000-209369

(51) Int. Cl.⁷ ................................................. C09J 7/02
(52) U.S. Cl. ...................... 428/40.1; 283/81; 428/41.3; 428/41.7; 428/41.8; 428/42.1; 428/201; 428/203; 428/204; 428/914
(58) Field of Search ............................. 428/40.1, 41.3, 428/41.7, 41.8, 42.1, 201, 203, 204, 914; 283/81

(56) References Cited

U.S. PATENT DOCUMENTS 5,618,600 A * 4/1997 Denklau ................. 428/41.8
6,210,524 B1 * 4/2001 Josephy ................. 156/344

FOREIGN PATENT DOCUMENTS

EP          705893 A2 *  4/1996

* cited by examiner

Primary Examiner—Nasser Ahmad
(74) Attorney, Agent, or Firm—Oblon, Spivak, McClelland, Maier & Neustadt, P.C.

(57) ABSTRACT

There is disclosed an optically transparent pressure sensitive adhesive sheet for heat transfer image pattern formation comprising an optically transparent film which has a first side constituting a heat transfer image pattern-receiving side and a second side opposite to the first side, an antistatic release sheet provided on the second side of the optically transparent film, via a pressure sensitive adhesive layer. Also disclosed is a first embodiment of an optically transparent decorative pressure sensitive adhesive sheet comprising the optically transparent pressure sensitive adhesive sheet and an image pattern formed by heat transfer method on the first side of the optically transparent film. In a second embodiment of the optically transparent decorative pressure sensitive adhesive sheet, a transparent functional film is laminated on the image pattern formed on the first side of the optically transparent film of the optically transparent pressure sensitive adhesive sheet, via a pressure sensitive adhesive layer. In a third embodiment of the optically transparent decorative pressure sensitive adhesive sheet, the antistatic release sheet is removed from the optically transparent pressure sensitive adhesive sheet having the image pattern on the first side of the optically transparent film, a transparent functional film is laminated on the second side of the optically transparent film, via the pressure sensitive adhesive layer exposed by removing the release sheet. In this embodiment, another pressure sensitive adhesive layer is provided on the side of the transparent functional film which is opposite to the side facing the optically transparent film. In a fourth embodiment of the optically transparent decorative pressure sensitive adhesive sheet, another transparent functional film is laminated on the image pattern formed on the optically transparent film in the third embodiment, via another pressure sensitive adhesive layer.

16 Claims, 2 Drawing Sheets

OPTICALLY TRANSPARENT PRESSURE SENSITIVE ADHESIVE SHEET FOR USE IN HEAT TRANSFER IMAGE PATTERN FORMATION AND OPTICALLY TRANSPARENT DECORATIVE PRESSURE SENSITIVE ADHESIVE SHEET

BACKGROUND OF THE INVENTION

1. Field of the Invention

The present invention relates to an optically transparent pressure sensitive adhesive sheet for heat transfer image pattern formation and an optically transparent decorative pressure sensitive adhesive sheet. Specifically, the present invention relates to an optically transparent pressure sensitive adhesive sheet for use in heat transfer image pattern formation which is transparent to visible light and is suitable for use in the production of a decorative pressure sensitive adhesive sheet that is used in such a manner as to be affixed to window glass, a plastic board for a window or a transparent partition employed in a room, and an optically transparent decorative pressure sensitive adhesive sheet produced with the optically transparent pressure sensitive adhesive sheet.

2. Description of the Related Arts

Plastic films having various functions have been used so as to be affixed to window glass, plastic boards for windows, etc. For example, affixed to show-windows, windows of buildings, windows of vehicles, etc. are films having one or more of the functions to shield ultraviolet radiation or infrared radiation, to prevent scattering of broken pieces of the windows, to prevent seeing through inside the windows and to decorate the windows.

Among those films, as decorative films on the surfaces of which various patterns are formed, available are only those produced on a large scale, such as those produced by silk screen process printing. However, users desire the realization of the easy and small scale production of decorative films having original designs so as to express their originalities.

Various computer-controlled printing methods are considered to satisfy the above-mentioned desire.

Such printing methods include the electrophotographic method, the ink jet method, the heat transfer method, etc. Among those methods, the heat transfer method is the most preferable for the reasons that operation and maintenance are easy, down sizing of the apparatuses and reducing costs are possible, running costs are low, no noises are generated, it is easy to impart durability for outdoor use, and so forth.

However, it was heretofore impossible to obtain clear image patterns by making printing on conventional films for windows with heat transfer type printers.

SUMMARY OF THE INVENTION

In view of the above, the object of the present invention is to provide an optically transparent decorative pressure sensitive adhesive sheet which is transparent to visible light and has a heat-transferred image pattern and good decorative characteristics and which is used in such a manner as to be affixed to window glass, a plastic board for a window or a transparent partition employed in a room, and to provide an optically transparent pressure sensitive adhesive sheet for use in heat transfer image pattern formation which is suitable for the production of the optically transparent decorative pressure sensitive adhesive sheet.

As a result of intensive research and development made by the inventors of the present invention in order to achieve the above-mentioned object, it has been found that the foregoing object can be attained by the use, as the optically transparent pressure sensitive adhesive sheet for heat transfer image pattern formation, of a pressure sensitive adhesive sheet comprising an optically transparent film on which a heat transfer image pattern can be formed and an antistatic release sheet laminated on the optically transparent film via a pressure sensitive adhesive layer, and by the use, as the optically transparent decorative pressure sensitive adhesive sheet, of such a pressure sensitive adhesive sheet in which a heat transfer image pattern is formed on the optically transparent film or such a pressure sensitive adhesive sheet in which the antistatic release sheet is removed and a functional film with a pressure sensitive adhesive layer on the back is laminated on the optically transparent film on the side where the antistatic release sheet has been removed. The present invention has been made based on the above findings.

Specifically, the present invention provides:

(1) an optically transparent pressure sensitive adhesive sheet comprising an optically transparent film which enables an image pattern to be heat-transferred thereonto and an antistatic release sheet laminated, via a pressure sensitive adhesive layer, on the side opposite to a heat transfer image pattern-receiving side of the optically transparent film;

(2) an optically transparent decorative pressure sensitive adhesive sheet in which an image pattern is formed by heat transfer method on the heat transfer image pattern-receiving side of the optically transparent film in the optically transparent pressure sensitive adhesive sheet set forth in the above paragraph (1);

(3) an optically transparent decorative pressure sensitive adhesive sheet, wherein a transparent functional film is laminated on that side of the optically transparent film on which the image pattern is formed in the optically transparent decorative pressure sensitive adhesive sheet set forth in the above paragraph (2);

(4) an optically transparent decorative pressure sensitive adhesive sheet, wherein the optically transparent decorative pressure sensitive adhesive sheet which is set forth in the above paragraph (2) or (3) but in which the antistatic release sheet has been removed and the pressure sensitive adhesive layer has been exposed is laminated, via thus exposed pressure sensitive adhesive layer, on one side of a transparent functional film having a pressure sensitive adhesive layer on the other side thereof; and (5) an optically transparent decorative pressure sensitive adhesive sheet set forth in the above paragraph (3) or (4), wherein the transparent functional film is a stainproof film, a metal-deposited film, an infrared cut-off film, a mat-textured film or a differently viewing film.

An optically transparent pressure sensitive adhesive sheet for heat transfer image pattern formation according to the present invention enables a heat transfer image pattern having good quality to be readily formed by the heat transfer method, and has transmission with respect to visible light.

With the use of an optically transparent pressure sensitive adhesive sheet for heat transfer image pattern formation according to the present invention, which enables easy formation of a heat transfer image pattern, there can be obtained a decorative pressure sensitive adhesive sheet that has good decorative characteristics and is transparent to visible light and that is used for decorative purposes in such a manner as to be affixed to window glass, a plastic board for a window or a transparent partition employed in a room.

Figure 1:
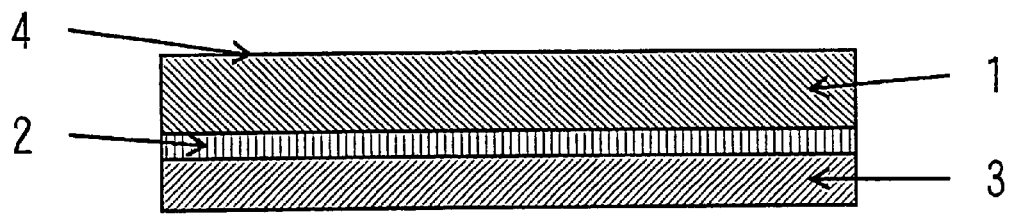
FIG. 1 is a cross-sectional view of the structure of an example of an optically transparent pressure sensitive adhesive sheet for heat transfer image pattern formation according to the present invention.

1: optically transparent film which enables an image pattern to be heat-transferred thereonto
2: pressure sensitive adhesive layer
3: antistatic release sheet
4: heat transfer image pattern-receiving side
5: heat transfer image pattern
6: pressure sensitive adhesive layer
7: transparent functional film
8: transparent functional film
9: pressure sensitive adhesive layer

DETAILED DESCRIPTION OF THE INVENTION

The optically transparent pressure sensitive adhesive sheet for heat transfer image pattern formation according to the present invention is an optically transparent pressure sensitive adhesive sheet which enables formation of a heat transfer image pattern on the surface thereof by heat transfer method, and comprises, as shown in FIG. 1, an optically transparent film 1 which enables an image pattern to be heat-transferred thereonto and an antistatic release sheet 3 laminated, via a pressure sensitive adhesive layer 2, on that side of the optically transparent film opposite to a heat transfer image pattern-receiving side 4.

As the heat transfer method to be employed for the optically transparent pressure sensitive adhesive sheet, both of the hot melt heat transfer method and the sublimation heat transfer method can be used: in the hot melt heat transfer method, a heat transfer body having an ink layer which comprises a colorant dispersed in hot meltable material is superimposed on an image pattern-receiving sheet, heat is applied to the heat transfer body in an image pattern-wise manner to thereby hot-melt the ink layer and transfer the image pattern on the image pattern-receiving sheet and to effect recording; and in the sublimation heat transfer method, a heat transfer body with an ink layer containing a sublimable dye or a thermally migratory dye (hereinafter referred to as simply a sublimable dye) is superimposed on an image pattern-receiving sheet, heat is applied to the heat transfer body in an image pattern-wise manner to thereby sublimate, or effect migration of, the sublimable dye of the ink layer on the image pattern-receiving sheet and to effect recording.

As the optically transparent film 1 which enables an image pattern to be heat-transferred thereonto used in the optically transparent pressure sensitive adhesive sheet for heat transfer image pattern formation according to the present invention, there can be used, in the cases where the hot melt heat transfer method is employed, a polymethyl methacrylate film, a polystyrene film, a polyurethane film and a polycarbonate film due to their transparency and adhesion properties with respect to the image pattern to be formed thereon. In addition, even a polyolefin film and a polyethylene terephthalate film, which have poor adhesion properties, can be used by way of subjecting them to a good adhesion properties-imparting treatment. Although a polyvinyl chloride film can also be used, it is not preferable since its applications are limited due to the fact that distortion of the image as viewed via the transmitted light tends to be generated and also since incineration of the polyvinyl chloride film will result in environmental pollution.

The optically transparent film which enables an image pattern to be heat-transferred thereonto used in the optically transparent pressure sensitive adhesive sheet for heat transfer image pattern formation according to the present invention has preferably a thickness of 5 $\mu$m to 200 $\mu$m, and more preferably 10 $\mu$m to 100 $\mu$m.

In the optically transparent pressure sensitive adhesive sheet for heat transfer image pattern formation according to the present invention, the pressure sensitive adhesive layer 2 provided on the side opposite to the heat transfer image pattern-receiving side 4 of the optically transparent film 1 which enables an image pattern to be heat-transferred thereonto can be made of, for example, an acrylic pressure sensitive adhesive, a rubber pressure sensitive adhesive, a urethane pressure sensitive adhesive or a silicone pressure sensitive adhesive. Among these types of pressure sensitive adhesives, an acrylic pressure sensitive adhesive, a urethane pressure sensitive adhesive and a silicone pressure sensitive adhesive are preferable due to their good durability and the like, and an acrylic pressure sensitive adhesive is especially preferable.

In the cases where the optically transparent pressure sensitive adhesive sheet for heat transfer image pattern formation according to the present invention is maintained to be affixed to a window glass or the like, a permanent adhesion type pressure sensitive adhesive may be used as the pressure sensitive adhesive layer 2, while in the cases where the optically transparent pressure sensitive adhesive sheet for heat transfer image pattern formation is used in such a manner that it is released from a window or the like short time after it is affixed thereto and is re-affixed to the same or another window or the like, a releasable type pressure sensitive adhesive may be used as the pressure sensitive adhesive layer 2.

The pressure sensitive adhesive layer 2 has preferably a thickness of 5 $\mu$m to 100 $\mu$m, and more preferably 10 $\mu$m to 50 $\mu$m.

In the present invention, an antistatic release sheet 3 is used as a release sheet provided on the surface of the pressure sensitive adhesive layer 2. If the release sheet has no antistatic properties, there is a risk that an image pattern with good quality cannot be formed on the heat transfer image pattern-receiving side 4 of the optically transparent film 1 which enables an image pattern to be heat-transferred thereonto by heat transfer method, due to the effect of static electricity, and in addition, jamming tends to be generated during passage through a printer. The antistatic release sheet has preferably a surface resistivity of $10^{12}$ $\Omega$ or less in terms of the antistatic effect, and more preferably $10^{10}$ $\Omega$ or less.

As a substrate sheet for the antistatic release sheet 3, a polyethylene terephthalate sheet or a polypropylene sheet having a thickness in the order of 5 μm to 100 μm is preferably used although the substrate sheet is not limited to such kinds of sheets. A releasant layer having a thickness of about 0.01 μm to 2 μm which may be made of silicone resin or the like is provided on that side of the antistatic release sheet 3 which is in contact with the pressure sensitive adhesive layer.

Examples of the method by which the antistatic properties are imparted to the antistatic release sheet 3 include the method in which an antistatic agent is incorporated into the substrate sheet, the method in which a coating layer containing an antistatic agent is provided between the substrate sheet and the releasant layer, the method in which a coating layer containing an antistatic agent is provided on the side opposite to that side of the substrate sheet on which the releasant layer is disposed, and the like.

Examples of the antistatic agent include nonionic antistatic agents, anionic antistatic agents, cationic antistatic agents, ampholytic antistatic agents, organic electronically-conductive compounds, electrically-conductive fine particles and the like. Among them, quaternary ammonium salts, which are a kind of the cationic antistatic agents, are preferable in terms of the antistatic effect.

Examples of the quaternary ammonium salts include lauryl trimethyl ammonium chloride, lauryl dimethyl benzyl ammonium chloride, cetyl pyridinium chloride, cetyl pyridinium bromide, stearamide methyl pyridinium chloride, lauryl trimethyl ammonium methosulfate and the like. In addition, examples of polymeric quaternary ammonium salts include styrene polymers of the type of quaternary ammonium salts, amino-alkyl (meth)acrylate polymers of the type of quaternary ammonium salts and the like. Specifically, examples of polymeric quaternary ammonium salts include polyvinyl benzyl trimethyl ammonium chloride, quaternary derivatives of poly-dimethyl amino-ethyl methacrylate, poly-diallyl dimethyl ammonium chloride and the like.

The coating layer containing the antistatic agent exemplified by the above-listed chemical species may be generally applied by preparing an aqueous coating solution containing a suitable organic polymer compound and the antistatic agent and applying it to the substrate sheet followed by drying. The coating layer is made to have generally a thickness in the order of 0.005 μm to 5.0 μm.

In the optically transparent pressure sensitive adhesive sheet for heat transfer image pattern formation according to the present invention, in order to impart ultraviolet shielding properties, any one of the optically transparent film 1, the pressure sensitive adhesive layer 2 and the layer which is to be subjected to a good adhesion properties-imparting treatment may optionally contain an ultraviolet absorbing agent or a light stabilizer. Examples of the ultraviolet absorbing agent include those of benzophenone type, benzotriazole type, cyanoacrylate type, salicylate type, anilidic oxalate type and the like. Examples of the light stabilizer include hindered amine compounds.

The optically transparent decorative pressure sensitive adhesive sheet according to the present invention will hereinbelow be explained.

Figure 2:
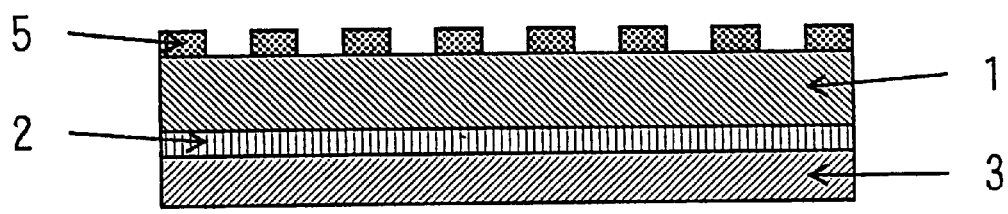
FIG. 2 is a cross-sectional view of the structure of an example of an optically transparent decorative pressure sensitive adhesive sheet according to the present invention.

There are the following four main embodiments for the optically transparent decorative pressure sensitive adhesive sheet according to the present invention:
(1) First Embodiment as Shown in FIG. 2

Figure 3:
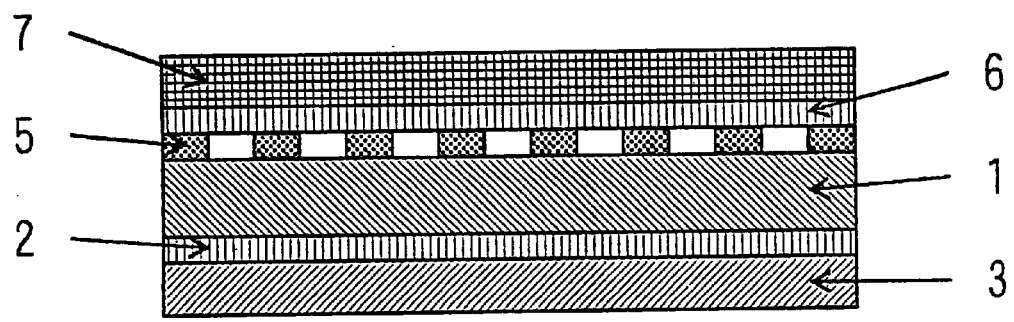
FIG. 3 is a cross-sectional view of the structure of another example of an optically transparent decorative pressure sensitive adhesive sheet according to the present invention.

An image pattern 5 is formed on the heat transfer image pattern-receiving side 4 of the optically transparent film 1 in the optically transparent pressure sensitive adhesive sheet for heat transfer image pattern formation by heat transfer method. (hereinafter referred to as optically transparent decorative pressure sensitive adhesive sheet I);
(2) Second Embodiment as Shown in FIG. 3

Figure 4:
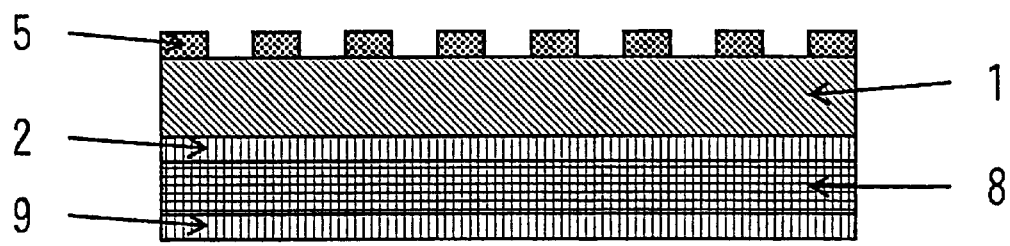
FIG. 4 is a cross-sectional view of the structure of another example of an optically transparent decorative pressure sensitive adhesive sheet according to the present invention.

A transparent functional film 7 is laminated, via the pressure sensitive adhesive layer 6, on that side of optically transparent decorative pressure sensitive adhesive sheet I on which the image pattern 5 is formed (hereinafter referred to as optically transparent decorative pressure sensitive adhesive sheet II);
(3) Third Embodiment as Shown in FIG. 4

Figure 5:
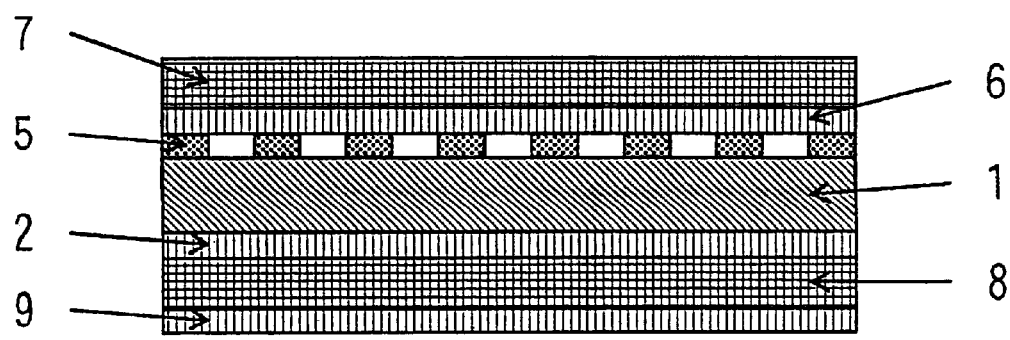
FIG. 5 is a cross-sectional view of the structure of another example of an optically transparent decorative pressure sensitive adhesive sheet according to the present invention, in which main reference numerals indicate the following elements.

Optically transparent decorative pressure sensitive adhesive sheet I in which the antistatic release sheet 3 has been removed is laminated, via the pressure sensitive adhesive layer 2 which has been exposed, on one side of a transparent functional film 8 having a pressure sensitive adhesive layer 9 on the other side thereof (hereinafter referred to as optically transparent decorative pressure sensitive adhesive sheet III); and
(4) Fourth Embodiment as Shown in FIG. 5

Optically transparent decorative pressure sensitive adhesive sheet II in which the antistatic release sheet 3 has been removed is laminated, via the pressure sensitive adhesive layer 2 which has been exposed, on one side of a transparent functional film 8 having a pressure sensitive adhesive layer 9 on the other side thereof (hereinafter referred to as optically transparent decorative pressure sensitive adhesive sheet IV).

FIG. 2 is a cross sectional view showing the structure of optically transparent decorative pressure sensitive adhesive sheet I in which a heat transfer image pattern 5 is formed on the heat transfer image pattern-receiving side 4 of the optically transparent film 1 which enables an image pattern to be heat-transferred thereonto. The antistatic release sheet 3 is laminated on that side of the optically transparent film 1 which is opposite to the heat transfer image pattern-receiving side 4 on which the image pattern 5 is formed, via the pressure sensitive adhesive layer 2.

FIG. 3 is a cross sectional view showing the structure of optically transparent decorative pressure sensitive adhesive sheet II wherein the transparent functional film 7 is laminated on the heat transfer image pattern 5 formed on the heat transfer image pattern-receiving side 4 of the optically transparent film 1 which enables an image pattern to be heat-transferred thereonto, via the pressure sensitive adhesive layer 6. The antistatic release sheet 3 is laminated on that side of the optically transparent film 1 which is opposite to the heat transfer image pattern-receiving side 4 on which the image pattern 5 is formed, via the pressure sensitive adhesive layer 2.

FIG. 4 is a cross sectional view showing the structure of optically transparent decorative pressure sensitive adhesive sheet III wherein the heat transfer image pattern 5 is formed on the heat transfer image pattern-receiving side of the optically transparent film 1 which enables an image pattern to be heat-transferred thereonto. The transparent functional film 8 is laminated on the side opposite to the side of the optically transparent film 1 to the side on which the heat transfer image pattern 5 is formed, via the pressure sensitive adhesive layer 2. The transparent functional film 8 has the pressure sensitive adhesive layer 9 on the side opposite to the side facing the optically transparent film 1.

FIG. 5 is a cross sectional view showing the structure of optically transparent decorative pressure sensitive adhesive sheet IV wherein the transparent functional film 7 is laminated on the heat transfer image pattern 5 formed on the heat transfer image pattern-receiving side 4 of the optically transparent film 1 which enables an image pattern to be heat-transferred thereonto, via the pressure sensitive adhesive layer 6. The transparent functional film 8 is laminated on the side opposite to the side of the optically transparent film 1 on which the heat transfer image pattern 5 is formed, via the pressure sensitive adhesive layer 2. The transparent functional film 8 has the pressure sensitive adhesive layer 9 on the side opposite to the side facing the optically transparent film 1.

The transparent functional films (indicated by reference numerals 7 and 8 shown in FIGS. 3–5) are used for the purpose of improvement in an aesthetic effect and the purpose of imparting unique design characteristics which are not obtained by printing, as well as the purpose of protecting the image pattern, such as improvement in weather resistance, resistance to scratch, stain resistance, etc., and the purpose of protecting and/or improving the environment, such as the prevention of scattering of broken pieces of the windows, the infrared cut-off effect, the ultraviolet cut-off effect, etc.

Examples of the transparent functional films used for the purpose of protecting the image patterns include hard coat films, stainproof films, etc. Examples of the transparent functional films used for the purpose of protecting and/or improving the environment include films for the prevention of scattering broken pieces of glass, infrared cut-off films, ultraviolet cut-off films, etc. Examples of the transparent functional films used for the purpose of improvement in an aesthetic effect and the design characteristics include metal-deposited films, mat-textured films, differently viewing films, etc.

Such transparent functional films may be those in which transparency and the intended functions are imparted to the films themselves or those in which coatings providing the intended functions are formed on the surfaces of transparent substrate films.

The stainproof films may be those in which optically transparent films having low surface energy or those in which coatings having low surface energy are formed on the surfaces of non-colored or colored transparent substrate films.

Examples of the film having low surface energy include fluoroplastic films made of poly-tetrafluoroethylene, an ethylene-tetrafluoroethylene copolymer, a tetrafluoroethylene-hexafluoropropylene copolymer, etc. and composite resin films made of the above-mentioned fluoroplastics and general-purpose resins, such as acrylic resins. Examples of the coating having low surface energy include those each comprising one of the above-mentioned fluoroplastics or silicone resin as a main component. If the stainproof film is used as the transparent functional film to be laminated on the heat transfer image pattern 5, dust and dirt hardly stick to the obtained optically transparent decorative pressure sensitive adhesive sheet or dust and dirt can be easily removed even if they stick to the optically transparent decorative pressure sensitive adhesive sheet, so that an aesthetic effect can be maintained for a long time.

Examples of the infrared cut-off film include those in which an inorganic infrared-shielding material is deposited on a non-colored or colored transparent substrate film by, for example, the PVD method or those in which an infrared-shielding layer containing an inorganic or organic infrared-shielding material and a resin binder is provided on a substrate film.

Examples of the inorganic infrared-shielding material include metal oxides, such as zinc oxide, indium oxide, zinc sulfate, titanium oxide, tin oxide, ITO (indium tin-doped oxide), ATO (antimony-doped tin oxide), etc. Examples of the organic infrared-shielding material include cyanine compounds, squalylium compounds, thiol nickel complex salt compounds, phthalocyanine compounds, triaryl methane compounds, naphthoquinone compounds, anthraquinone compounds, amino compounds, etc. Specifically, examples of the amino compounds include a perchlorate of N,N,N',N'-tetrakis (p-di-n-butylaminophenyl)-p-phenylenediaminium, a chlorine salt of phenylenediaminium, a hexafluoro antimonate of phenylenediaminium, a fluoborate of phenylenediaminium, a fluorine salt of phenylenediaminium, a perchlorate of phenylenediaminium, etc.

In the cases where the inorganic infrared-shielding material is deposited on the substrate film by the PVD method to make the infrared cut-off film, a protective layer may be provided on the inorganic infrared-shielding material deposition layer as is the case with the metal-deposited films described later.

The infrared cut-off film has generally a heat radiation-shielding coefficient of about 0.4 to 0.7, a visible light (380 nm~780 nm) transmission of about 10% to 80% and a solar radiation (350 nm~2100 nm) reflectance of about 5% to 60%.

With such an infrared cut-off film, cooling effect within a room can be improved and energy saving effect can be enjoyed.

The metal-deposited film is an optically transparent (see-through) film which may be made by depositing a metallic material on a non-colored or colored transparent substrate film by means of the PVD method (the physical vapor phase deposition method), such as the vacuum deposition method, the sputtering method, the ion plating method or the like. The metallic material may be anything that can be deposited on the substrate film by means of the PVD method, and examples of the metallic material include metals, such as aluminum, chromium, nickel, titanium, copper, gold, silver, etc., metal alloys, metal compounds and the like, although not limited thereto. Among those examples, aluminum is especially preferable in terms of the balance between the easiness in deposition, the economical aspect, the aspect of the design characteristics obtained and the like.

The metal-deposited film has generally a visible light (380 nm~780 nm) transmission of about 10% to 70% and a solar radiation (350 nm~2100 nm) reflectance of about 20% to 80%.

The visible light transmission can be controlled by the thickness of the metallic material deposition layer. The range of thickness of the metallic material deposition layer which renders the metallic material deposition layer optically transparent depends on the kind of the metallic material that constitutes the metallic material deposition layer, but it is generally between 1 nm and 20 nm.

A protective layer may be provided on the metal-deposited film for the purpose of protecting the metallic material deposition layer and/or improving the adhesion between the metallic material deposition layer and the pressure sensitive adhesive layer. Examples of the protective layer generally include acrylic resins, polyester resins, polyolefin resins, polyurethane resins, vinyl acetate resins and the like. The thickness of the protective layer is generally about 0.1 $\mu$m to about 10 $\mu$m.

With such a metal-deposited film, decorative effects, like a magic mirror, can be obtained, and the image is or is not seen depending on the effect of light and shade inside and outside the room. Further, energy saving effect can be enjoyed, since the solar radiation is reflected due to half-mirror effect by the metal-deposited film.

The mat-textured film is a film in which a surface roughness of about 0.01 μm to 1.00 μm expressed in terms of the Ra value is imparted to a transparent substrate film, with the surface roughness being dependent on the intended design characteristics. The mat-textured film provides the design characteristics similar to those which ground glass has, and imparts sophisticated texture to the image pattern produced by printing which has only gloss.

The differently viewing film is a film in which the image can be seen when viewed from a given angle or angles, that is, the image or the background can or cannot be seen depending on the viewing angle. Thus, the differently viewing film provides a unique eye-catching effect. Examples of the differently viewing film include oriented films, such as a film which is produced from a photo-setting urethane resin is cured in such a manner that the molecules are oriented in a given direction, and laminated films each made up of the oriented film and a transparent substrate film.

The substrate film of the transparent functional film may be a film made of cellulose triacetate, cellulose diacetate, cellophane, stretched polypropylene, cast polypropylene, polyethylene, polystyrene, polyurethane, polycarbonate, polyvinyl alcohol, polyvinyl chloride, polymethyl methacrylate, polyethylene terephthalate, or the like to which one or more of various functions are imparted.

The substrate film has preferably a thickness of 5 μm to 200 μm, and more preferably 10 μm to 100 μm. The substrate film may be non-colored or colored as long as it is transparent.

The visible light transmission, the solar radiation reflectance and the heat radiation-shielding coefficient values are those determined in such a manner that the transparent functional films are affixed to float glass sheets having a thickness of 3 mm and are measured for the visible light transmission, the solar radiation reflectance and the heat radiation-shielding coefficient values according to JIS (Japanese Industrial Standards) A5759.

With respect to optically transparent decorative pressure sensitive adhesive sheets I to IV, the overall sheet except the antistatic release sheet has preferably a visible light transmission of 10% to 95%.

The material and the thickness for each of the pressure sensitive adhesive layers 6 and 9 in optically transparent decorative pressure sensitive adhesive sheets II to IV as shown in FIGS. 3–5 may be the same as those for the pressure sensitive adhesive layer 2 which is provided on the side opposite to the heat transfer image pattern-receiving side 4 of the optically transparent film 1 that enables an image pattern to be heat-transferred thereonto. Further, each of the pressure sensitive adhesive layers 6 and 9 may optionally contain an ultraviolet absorbing agent and/or a light stabilizer.

A release sheet is generally disposed on the pressure sensitive adhesive layer 9 for optionally transparent decorative pressure sensitive adhesive sheets III and IV as shown in FIGS. 4 and 5 until optionally transparent decorative pressure sensitive adhesive sheets III and IV are brought into use. Examples of such a release sheet include those which are the same as what are used for the antistatic release sheet, paper, such as glassine paper, coated paper, laminated paper, etc., and various plastic films which are coated with a release agent, such as silicone resin and the like. The release sheet may or may not have antistatic properties. The release sheet may have a thickness of 20 μm to 150 μm, although the thickness is not limited to that range.

When the optically transparent decorative pressure sensitive adhesive sheet according to the present invention is used, the release sheet is removed from the optically transparent decorative pressure sensitive adhesive sheet, and the resulting optically transparent decorative pressure sensitive adhesive sheet is affixed to a window, a transparent partition or the like, with the pressure sensitive adhesive layer side of the optionally transparent decorative pressure sensitive adhesive sheet being brought into contact with the inside or outside of the window, the transparent partition or the like depending on the intended uses.

The present invention will hereinbelow be described in further detail with reference to the following examples, but the present invention is not limited to such examples.

EXAMPLE 1

An antistatic release sheet was laminated on one side of a polymethyl methacrylate film ("ACRYPREN" available from Mitsubishi Rayon) having a thickness of 50 μm, via a layer made of a permanent adhesion type acrylic pressure sensitive adhesive ("PU-V" available from Lintec Corporation) containing an ultraviolet absorbing agent and having a thickness of 20 μm, to thereby obtain an optically transparent pressure sensitive adhesive sheet for heat transfer image pattern formation.

The antistatic release sheet used was a polyethylene terephthalate film having a thickness of 25 μm which had been subjected to a releasing treatment on one side thereof using silicone resin and to an antistatic treatment on the other side thereof using a quaternary ammonium salt. The antistatic release sheet had a surface resistivity of $1 \times 10^8$ Ω.

In this optically transparent pressure sensitive adhesive sheet, the laminated sheet made up of the polymethyl methacrylate film and the pressure sensitive adhesive layer had a visible light transmission of 87%.

EXAMPLE 2

A heat transfer image pattern was formed on the heat transfer image pattern formation side of the polymethyl methacrylate film in the optically transparent pressure sensitive adhesive sheet produced in Example 1, using a heat transfer printer ("MSP36" available from Showa Jyoho Kiki K.K.), to thereby obtain a decorative pressure sensitive adhesive sheet.

EXAMPLE 3

A fluorine resin film ("TEDLAR PVF" available from Du-Pont) having a thickness of 25 μm was laminated, as a stainproof protective film, on the image pattern on the decorative pressure sensitive adhesive sheet obtained in Example 2, via a layer made of a permanent adhesion type acrylic pressure sensitive adhesive ("PL SIN" available from Lintec Corporation) having a thickness of 20 μm, to thereby obtain an optically transparent decorative pressure sensitive adhesive sheet.

EXAMPLE 4

The antistatic release sheet was removed from the decorative pressure sensitive adhesive sheet obtained in Example 2. Then, an aluminum-deposited polyethylene terephthalate film (a thickness of 25 μm, a visible light transmission of 20%, a solar radiation reflectance of 50%) on the back side of which a layer made of an acrylic pressure sensitive adhesive ("PU-V" available from Lintec Corporation) having a thickness of 20 μm was provided was laminated on that side of the decorative pressure sensitive adhesive sheet where the antistatic release sheet had been removed, whereby an optically transparent decorative pressure sensitive adhesive sheet provided with a metal-deposited film was obtained. The obtained optically transparent decorative pressure sensitive adhesive sheet had a visible light transmission of 15%.

EXAMPLE 5

An optically transparent decorative pressure sensitive adhesive sheet laminated with an infrared cut-off film was produced in a procedure similar to that of Example 4 except that a tin oxide-deposited polyethylene terephthalate film (a thickness of 25 μm, a visible light transmission of 65%, a solar radiation reflectance of 33%, a heat radiation-shielding coefficient of 0.59) was used instead of the aluminum-deposited polyethylene terephthalate film in Example 4. The obtained optically transparent decorative pressure sensitive adhesive sheet had a visible light transmission of 57%.

EXAMPLE 6

On the image pattern formed on the decorative pressure sensitive adhesive sheet obtained in Example 2, a polyethylene terephthalate film having a surface roughness Ra of 0.24 μm and a thickness of 25 μm was laminated, via a layer made of an acrylic pressure sensitive adhesive ("PU-V" available from Lintec Corporation) having a thickness of 20 μm, to thereby obtain an optically transparent decorative pressure sensitive adhesive sheet. The obtained optically transparent decorative pressure sensitive adhesive sheet had a visible light transmission of 57%.

EXAMPLE 7

The antistatic release sheet was removed from the optically transparent decorative pressure sensitive adhesive sheet obtained in Example 3. Then, a differently viewing film ("Lumisty" available from Lintec Corporation; a thickness of 200 μm, a urethane specialty film) on the back side of which a layer made of an acrylic pressure sensitive adhesive ("PU-V" available from Lintec Corporation) having a thickness of 20 μm was provided was laminated on that side of the optically transparent decorative pressure sensitive adhesive sheet where the antistatic release sheet had been removed, whereby an optically transparent decorative pressure sensitive adhesive sheet provided with a differently viewing film was obtained. The obtained optically transparent decorative pressure sensitive adhesive sheet had a visible light transmission of 59%.

In the above-described Examples 1 to 7, as a laminating apparatus, "LAgLA-3644" available from Lintec Corporation was used in the lamination procedures for the corresponding films.

What is claimed is:

1. An optically transparent decorative pressure sensitive adhesive sheet comprising:
   (a) an optically transparent pressure sensitive adhesive sheet for heat transfer image pattern formation comprising:
      an optically transparent film which enables an image pattern to be heat-transferred thereonto and which has a first side constituting a heat transfer image pattern-receiving side and a second side opposite to the first side; and
      an antistatic release sheet having a surface resistivity of $10^{12}$ Ω or less laminated on the second side of the optically transparent film, via a pressure sensitive adhesive layer;
   (b) an image pattern formed by heat transfer method on the heat transfer image pattern-receiving side of the optically transparent film in the optically transparent pressure sensitive adhesive sheet; and
   (c) a transparent functional film which is laminated on the first side of the optically transparent film on which the image pattern is formed, wherein the transparent functional film is selected from the group consisting of a stainproof film, a metal-deposited film, an infrared cut-off film, a mat-textured film and a differently viewing film.

2. An optically transparent decorative pressure sensitive adhesive sheet comprising:
   (a) an optically transparent decorative pressure sensitive adhesive sheet comprising:
      an optically transparent pressure sensitive adhesive sheet for heat transfer image pattern formation comprising:
         (i) an optically transparent film which enables an image pattern to be heat-transferred thereonto and which has a first side constituting a heat transfer image pattern-receiving side and a second side opposite to the first side; and
         (ii) an antistatic release sheet having a surface resistivity of $10^{12}$ Ω or less laminated on the second side of the optically transparent film, via a pressure sensitive adhesive layer, and
      an image pattern formed by heat transfer method on the heat transfer image pattern-receiving side of the optically transparent film in the optically transparent pressure sensitive adhesive sheet,
      wherein the antistatic release sheet has been removed and first pressure sensitive adhesive layer has been exposed after the formation of the image pattern;
   (b) a transparent functional film laminated on the second side of the optically transparent film, via the first pressure sensitive adhesive layer; and
   (c) a second pressure sensitive adhesive layer provided on the transparent functional film on a side of the transparent functional film remote from the optically transparent film.

3. An optically transparent decorative pressure sensitive adhesive sheet comprising:
   (a) an optically transparent decorative pressure sensitive adhesive sheet comprising:
      an optically transparent pressure sensitive adhesive sheet for heat transfer image pattern formation comprising:
         (i) an optically transparent film which enables an image pattern to be heat-transferred thereonto and which has a first side constituting a heat transfer image pattern-receiving side and a second side opposite to the first side; and
         (ii) an antistatic release sheet having a surface resistivity of $10^{12}$ Ω or less laminated on the second side of the optically transparent film, via a pressure sensitive adhesive layer, and
      an image pattern formed by heat transfer method on the heat transfer image pattern-receiving side of the optically transparent film in the optically transparent pressure sensitive adhesive sheet,
      wherein that the antistatic release sheet has been removed and first pressure sensitive adhesive layer has been exposed after the formation of the image pattern;
   (b) a second transparent functional film laminated on the second side of the optically transparent film, via the first pressure sensitive adhesive layer; and (c) a second pressure sensitive adhesive layer provided on the second transparent functional film on a side of the second transparent functional film remote from the optically transparent film.

4. The optically transparent decorative pressure sensitive adhesive sheet according to claim 2, wherein the transparent functional film is selected from the group consisting of a stainproof film, a metal-deposited film, an infrared cut-off film, a mat-textured film and a differently viewing film.

5. The optically transparent decorative pressure sensitive adhesive sheet according to claim 3, wherein each of the first and second transparent functional films is selected from the group consisting of a stainproof film, a metal-deposited film, an infrared cut-off film, a mat-textured film and a differently viewing film.

6. The optically transparent decorative pressure sensitive adhesive sheet according to claim 1, wherein the optically transparent film has been subjected to an anchor improving treatment and wherein the optically transparent film is selected from the group consisting of a polymethyl methacrylate film, a polystyrene film, a polyurethane film and a polycarbonate film, and a polyolefin film and a polyethylene terephthalate film.

7. The optically transparent decorative pressure sensitive adhesive sheet according to claim 2, wherein the optically transparent film has been subjected to an anchor improving treatment and wherein the optically transparent film is selected from the group consisting of a polymethyl methacrylate film, a polystyrene film, a polyurethane film and a polycarbonate film, and a polyolefin film and a polyethylene terephthalate film.

8. The optically transparent decorative pressure sensitive adhesive sheet according to claim 3, wherein the optically transparent film has been subjected to an anchor improving treatment and wherein the optically transparent film is selected from the group consisting of a polymethyl methacrylate film, a polystyrene film, a polyurethane film and a polycarbonate film, and a polyolefin film and a polyethylene terephthalate film.

9. The optically transparent pressure sensitive adhesive sheet according to claim 1, wherein the optically transparent film has a thickness of 5 to 200 $\mu$m.

10. The optically transparent pressure sensitive adhesive sheet according to claim 1, wherein the pressure sensitive adhesive layer has a thickness of 5 to 100 $\mu$m.

11. The optically transparent pressure sensitive adhesive sheet according to claim 1, wherein the antistatic release sheet has a surface resistivity of $10^{10}$ $\Omega$ or less.

12. The optically transparent pressure sensitive adhesive sheet according to claim 1, wherein the antistatic release sheet comprises a substrate sheet.

13. The optically transparent pressure sensitive adhesive sheet according to claim 1, wherein the substrate sheet is selected from the group consisting of a polyethylene terephthalate sheet or a polypropylene sheet.

14. The optically transparent pressure sensitive adhesive sheet according to claim 1, wherein the substrate sheet has a thickness of 5 to 100 $\mu$m.

15. The optically transparent pressure sensitive adhesive sheet according to claim 1, wherein the antistatic release sheet comprises a silicone resin releasant layer having a thickness of 0.01 to 2 $\mu$m.

16. The optically transparent pressure sensitive adhesive sheet according to claim 1, wherein the antistatic release sheet comprises an antistatic agent selected from the group consisting of a nonionic antistatic agent, an anionic antistatic agent, a cationic antistatic agent, an ampholytic antistatic agent, an organic electronically-conductive compound, and an electrically-conductive fine particle.

* * * * *